United States Patent
Eddi et al.

(10) Patent No.: US 12,465,166 B2
(45) Date of Patent: Nov. 11, 2025

(54) PACKAGE DELIVERY RECEIVING SYSTEM

(71) Applicant: Eddi Group Global Inc., Edison, NJ (US)

(72) Inventors: Ely Eddi, Ocean Township, NJ (US); Gregory Paul Spalt, Stuart, FL (US)

(73) Assignee: Eddi Group Global Inc., Edison, NJ (US)

( * ) Notice: Subject to any disclaimer, the term of this patent is extended or adjusted under 35 U.S.C. 154(b) by 167 days.

(21) Appl. No.: 18/059,428

(22) Filed: Nov. 29, 2022

(65) Prior Publication Data

US 2024/0172885 A1 May 30, 2024

(51) Int. Cl.
*A47G 29/28* (2006.01)
*A47G 29/14* (2006.01)

(52) U.S. Cl.
CPC ........... *A47G 29/28* (2013.01); *A47G 29/141* (2013.01); *A47G 2029/145* (2013.01)

(58) Field of Classification Search
CPC ........ A47G 29/28; A47G 29/20; A47G 29/22; A47G 29/141; A47G 2029/145; A47G 2029/149; E05G 7/00; E06B 7/32; G06Q 10/0836; B64U 2101/64; B64U 2101/66; B64D 1/02; B64F 1/32; B64C 39/024
See application file for complete search history.

(56) References Cited

U.S. PATENT DOCUMENTS

| | | | | |
|---|---|---|---|---|
| 10,026,054 B1 * | 7/2018 | Staton | ................. | G06Q 10/0832 |
| 10,028,606 B1 * | 7/2018 | Ritchie | ................. | A47G 29/12 |
| 10,093,432 B2 * | 10/2018 | McKinnon | .............. | B64F 1/007 |
| 10,147,067 B2 | 12/2018 | Pleis | | |
| 10,457,421 B2 | 10/2019 | O'Toole | | |
| 10,703,507 B2 * | 7/2020 | Comerford | .............. | B64D 1/02 |
| 10,954,068 B2 * | 3/2021 | Nevison | ................ | G05B 15/02 |
| 11,066,186 B2 | 7/2021 | Walsh et al. | | |
| 11,396,383 B2 * | 7/2022 | Kim | ........................ | H04W 4/80 |
| 2015/0158599 A1 * | 6/2015 | Sisko | ........................ | B64F 1/20 244/114 R |
| 2015/0183528 A1 * | 7/2015 | Walsh | ..................... | A47G 29/14 244/114 R |
| 2016/0101874 A1 * | 4/2016 | McKinnon | ............. | A47G 29/14 244/114 R |
| 2017/0116568 A1 * | 4/2017 | Pleis | ...................... | A47G 29/14 |
| 2017/0286905 A1 * | 10/2017 | Richardson | ........ | G06Q 10/0836 |
| 2018/0049575 A1 | 2/2018 | Yamrick | | |
| 2018/0070753 A1 * | 3/2018 | Eveloff | ................ | H04W 4/025 |

(Continued)

FOREIGN PATENT DOCUMENTS

| | | |
|---|---|---|
| CN | 111741699 A | 10/2020 |
| WO | WO2016163779 | 10/2016 |

*Primary Examiner* — William L Miller
(74) *Attorney, Agent, or Firm* — Finn IP Law, PC; Jeffrey A. Finn (57) ABSTRACT

The present invention discloses a system, device, and method for receiving on-site dropped packages delivered to a structure. The system preferably comprises an off-the-shelf object-receiving unit easily installable in an opening in a building, such as a standard window opening. In embodiments, the unit includes a hingeably movable section that automatically opens when a parcel intended for it is near and closes itself after delivery. The parcel may then be retrieved via a door or window on the inside of the unit by a person in the room in which the unit is installed.

18 Claims, 4 Drawing Sheets

(56) References Cited

U.S. PATENT DOCUMENTS

| | | | |
|---|---|---|---|
| 2018/0092484 A1* | 4/2018 | Lewis | B64U 80/70 |
| 2018/0105289 A1 | 4/2018 | Walsh et al. | |
| 2018/0174099 A1* | 6/2018 | Winkle | G07C 9/00896 |
| 2018/0352988 A1* | 12/2018 | Ortiz | A47G 29/20 |
| 2019/0102730 A1 | 4/2019 | Giorgi et al. | |
| 2019/0217971 A1* | 7/2019 | Comerford | B64D 1/02 |
| 2019/0291961 A1* | 9/2019 | Urban | G06Q 50/40 |
| 2019/0300202 A1* | 10/2019 | High | B64F 1/32 |
| 2020/0013008 A1* | 1/2020 | Newcomb | A47G 29/14 |
| 2020/0231393 A1* | 7/2020 | Mercado | G06Q 10/083 |
| 2020/0288895 A1 | 9/2020 | Bennet et al. | |
| 2020/0352376 A1* | 11/2020 | Vernal Silva | A47G 29/1254 |
| 2020/0385119 A1* | 12/2020 | Hanke | E06B 3/2605 |
| 2020/0407079 A1* | 12/2020 | Kim | H02J 50/90 |
| 2021/0045564 A1 | 2/2021 | Duckers et al. | |
| 2021/0106160 A1* | 4/2021 | Janas | A47G 29/30 |
| 2021/0259448 A1* | 8/2021 | Morgan | A47G 29/28 |
| 2021/0282580 A1* | 9/2021 | Nakanishi | B64F 1/368 |
| 2021/0284451 A1 | 9/2021 | Burchat | |
| 2022/0058575 A1* | 2/2022 | Moudy | G07F 9/002 |
| 2022/0361700 A1* | 11/2022 | Reinhard | A47G 29/30 |
| 2023/0218100 A1* | 7/2023 | Meyrowitz | A47G 29/16 |
| | | | 340/569 |
| 2024/0000256 A1* | 1/2024 | Eastman | A47G 29/141 |
| 2024/0270408 A1* | 8/2024 | Walsh | B64F 1/32 |

\* cited by examiner

FIG. 5

PACKAGE DELIVERY RECEIVING SYSTEM

FIELD OF THE INVENTION

The present invention relates to the field of package delivery, and in particular to systems for the secure delivery of packages to physical structures via aerial devices such as drones.

BACKGROUND OF THE INVENTION

The volume of deliveries of packaged goods has exploded in recent years due to the mass adoption of online shopping, the pandemic and other factors. Moving packaged goods located in warehouses to their final destinations is a complex logistics endeavor traditionally only feasible at scale by large operations like US Postal Service, UPS, Federal Express and others that enjoy massive economies of scale. A typical delivery flow for an ordered item may comprise transiting the package from a national warehouse to a local or regional delivery destination, to be loaded onto a vehicle that is then driven to its final destination, such as a home, apartment or office building. Solving the problem of this last step, often called "the last mile", has been the subject of a great deal of effort and innovation by companies large and small. The unmanned aerial vehicle (UAV) such as the drone has recently been proposed as what some say is the "holy grail" solution to the last mile logistics problem.

Indeed, in recent years, UAV/drone commercial delivery industry has been emerging, with start-ups, multinational companies, independent developers, visionaries, consultants and investors worldwide working on and investing millions of dollars to develop and bring to the market the myriad technologies and establish the regulatory frameworks needed for successful last-mile, UAV package delivery. Examples, of such companies include Alphabet's Wing, Amazon's Air Prime Delivery service, and others.

One critical piece of this logistics puzzle is the very last step of the last mile for UAV package delivery, what we will call "the drop." This refers to the act of the UAV releasing the package, or parcel, it is carrying at its intended final delivery spot, whether it is at a home, place of business, some common area for the recipient to retrieve the package or otherwise. This drop ("on site drop") ideally occurs right at the "ship to" address, whether it is a home, building, or other structure to which the recipient wants it delivered.

Unfortunately, because existing homes, apartments and office buildings were and are not designed with drone package delivery in mind, these structures are not built with dedicated and secure on-site drop spots. And, they typically do not have readily available spots amenable to convert them into onsite drops, especially when considering the need for security ("the customer onsite drop problem"). A number of solutions to this problem have been proposed, from providing special standalone, "drop box" structures or drone delivery pads near the addressee location, to professionally retrofitting addressee structures with drone delivery boxes or receptacles.

For example, US Pub. Nos. 2021/04564 to Druckers, et al. and 2017/0116568 to Pleis propose retrofit solutions for drone on site drops in the form of devices installed onto a roof having trap doors for receiving packages. Other solutions are of the type of standalone receiving boxes such as the box disclosed is WO/2016/163779 to Lee. And, when it comes to drone delivery to larger buildings, such as multi-floor apartment buildings, common tenant solutions, such as installing shoots on the outside of the building, have been proposed as a solution.

Unfortunately, none of these solutions provide an easy, low cost and secure way to retrofit existing homes, apartment buildings or office buildings with to be transformed into an on-site drop location.

Accordingly, what is needed is a low-cost, off-the-shelf, easy to self-install solution to the last mile, on-site drop package delivery problem, especially for occupants of existing, often multi-story, buildings.

BRIEF DESCRIPTION OF DRAWINGS

Further advantages of the present invention may become apparent to those skilled in the art with the benefit of the following detailed description of the preferred embodiments and upon reference to the accompanying drawings in which.

DETAILED DESCRIPTION OF THE INVENTION

The present invention discloses a parcel delivery system, including a unit (e.g., a container or box) for installing in an opening in a wall of the building that securely receives packages delivered from the air, for example from an autonomous aerial delivery vehicle such as a drone, or alternatively from the ground.

In one preferred embodiment, a unit for installing in an opening in a wall of a building for receiving an object intended to be delivered to it is disclosed. The wall has a first surface facing outdoors and a second surface facing an inside of the building. In such embodiment, the unit includes a non-movable section when the unit is installed in the opening, and a movable section connected to the non-movable section. The movable section is adapted to move to an open position so that the object may be deposited inside the unit and to move to a closed position after the object is deposited therein. Thus, when the movable section is in an open position, an inside surface of the movable section defines at least part of an object receiving platform onto which the object may be deposited.

In embodiments, the unit further includes a first extendable side wing having one end connected to a first side of the non-movable section and an opposite end for fastening to a first side of the opening. The opening in the wall of the building may be a window opening. The unit may further include a second extendable side wing having one end connected to a second side of the non-movable section opposing the first side of the non-movable section, and an opposite end for fastening to a second side of the window opening.

In some embodiments, the non-movable section of the unit preferably includes an inside floor that at least partially extends outside of the building when the unit is installed in the opening. the inside floor and inside surface of the movable section together defining the object receiving platform when the movable section is in the open position. In preferred embodiments, the object receiving platform is adapted to receive the object deposited thereon by an unmanned aerial delivery vehicle, such as a drone, or In yet other preferred embodiments, a sensor for sensing the proximity of the object intended to be delivered to the unit in included. The sensor communicates instructions to the unit to automatically open the movable section when the object \is proximate the unit. The sensor may be configured to sense the proximity of a tag connected to the object or a tag connected to the delivery vehicle carrying the object, suc as an unmanned aerial delivery vehicle.

The unit may also include a locking mechanism, such that when the movable section is in the closed position the movable section and non-movable section are locked closed. In some embodiments, when sensing that the object to be delivered to it is proximate the unit, the unit automatically unlocks the movable section and then the movable section moves to the open position The present invention also discloses a parcel-receiving unit for installing in an opening of a building and for receiving a package to be delivered therein. In embodiments, the unit comprises an outdoor section that, when the unit is installed in the opening, extends outside of the building. The outdoor section preferably includes an outer movable wall having upper and lower ends and an inner wall surface. It also includes a lid having a non-movable section and a movable section connected to the upper end of the outer movable wall. In this embodiment, the unit also includes a substantially horizontal, non-movable platform that, when the unit is installed in the opening, extends at least partly outside of the building The platform has an outer end hingeably connected to the lower end of the outer movable wall, such that when the outer movable wall is in a fully open position, the inner wall surface of the outer wall and the non-movable platform define an enlarged platform for receiving the package.

In embodiments, the unit includes an indoor section that, when the unit is installed in the building opening, is openable to the inside the building. The unit may able include an actuator for controllably swinging the outside section to open and closed positions. The actuator may automatically move the outside portion to the open position when receiving instructions that the package is ready to be delivered to the unit, and automatically moves the outside portion to the closed position after the package is deposited on the enlarged platform.

The unit may also preferably include a communications module in communication with a delivery vehicle or delivery person that is delivering the package and that instructs the actuator to open the outside portion when the package is within a predetermined distance from the unit. The unit may also include a sensor connected to the actuator that senses when a package is ready to be delivered to the unit is near and instructs the actuator to open the outside portion for receiving the package.

Turning to the indoor section, it may include a lockable door panel facing the inside of the building providing user access to the inside of the unit for retrieving a package deposited in the unit. The left and right sides of the unit may each having an adjustable wing extending outwardly therefrom, and wherein the unit is adapted to be adjustably installed in the building opening using the adjustable wings.

As is understood, preferably, the unit is adapted for receiving an object delivered to it by an unmanned aerial vehicle or a drone, and also via ground delivery. In the latter case, a device or person may deliver the object to the unit. In such case, it may be desirable for the object or the person have device such as an NFC tag that communicates with a sensor such as an NFC reader on the unit to open it for delivery.

It is to be understood that the invention is not limited in its application to the details of construction and the arrangement of components described hereinafter and illustrated in the drawings. Those skilled in the art will recognize that various modifications can be made without departing from the scope of the invention.

Referring now to the drawings, like reference numerals designate identical or corresponding features throughout the several views.

Figure 1:
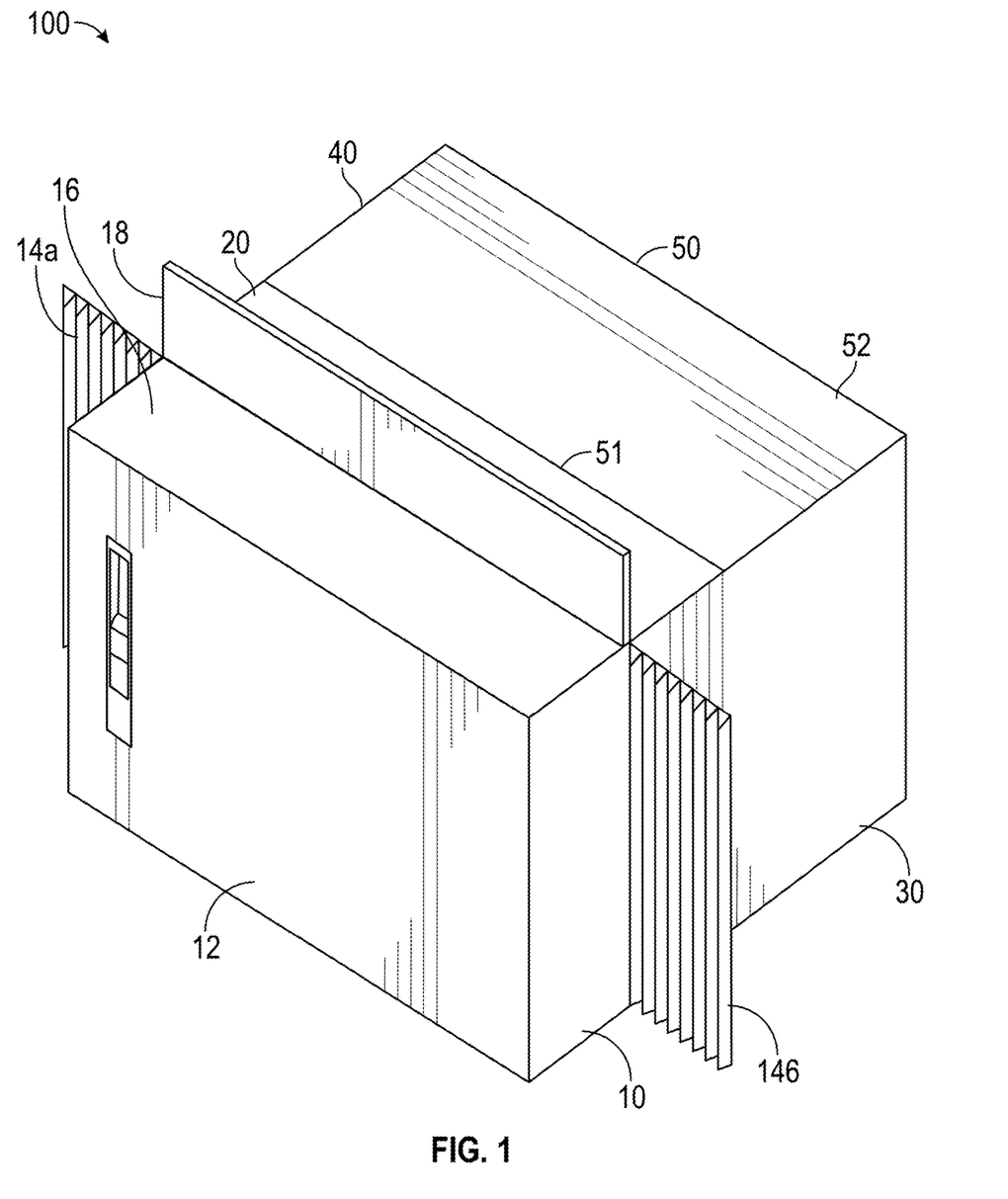
FIG. 1 is a diagrammatic perspective view of one embodiment of the inventive parcel or object receiving unit of the present invention.

In a preferred embodiment, a package or parcel receiving unit or box according to the present invention is shown in perspective views of FIGS. 1-4. Shown here is an exemplary perspective view of unit 100 (or variously called container or box 100) that is adapted to be installed in an opening of a wall of building (see FIG. 5) or other structure. FIG. 1 shows unit 100 as a standalone device in the fully closed position. Box 100 comprises two main pieces, namely, a main, non-movable section 10 that secures box 100 in place to its opening, and a connected movable section 50 that extends completely outdoors. When box 100 is in its closed position as seen in FIG. 1, the two main sections meet at junction 51, with outside cover portion 20 of main section 10 meeting movable section cover 52 of movable section 50. When closed, this junction preferably sealingly closes the box to the outside, such that it can protect the inner volume defined by the closed box from the elements and any object or objected in it. For example, there may be a tight seal at junction 51 preventing rain or other elements from entering the box. In preferred embodiments, the movable section may be locked in its closed position until it is directed to open.

In this preferred embodiment, non-movable section 10 includes inside door 12 that can swing or slide open to enable a person inside the room in which box 100 is installed to open and gain access to the inside of box 100 and retrieve any parcel that might have been deposited therein. Section 10 also includes in this embodiment inside cover portion 16 and outside cover portion 20 separated by upright flange 18, and outside side walls 30, 40 (see FIG. 2). Upright flange 18 serves to secure box 100 against a vertically siliding window that may close down on the top of outside cover portion 20.

Optionally, section 10 may come with built-in adjustable, accordion-like side wings 14a, 14b to accommodate a wide range of building opening widths. Again, these structures and functionality are well understood in the context of unrelated arts, for example window air conditioning units.

Figure 2:
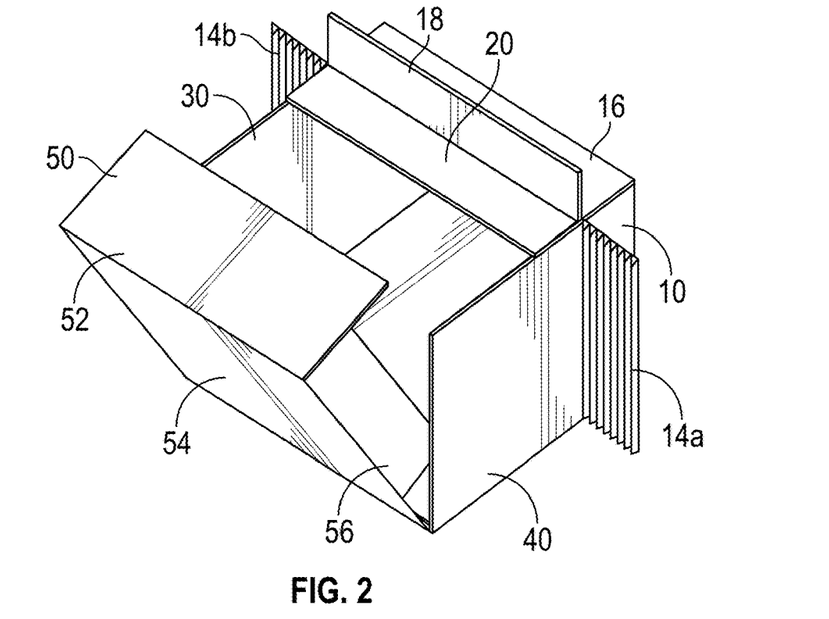
FIG. 2 is a diagrammatic perspective view of the unit of FIG. 1 showing its outer movable section in a partially opened position.
Figure 3:
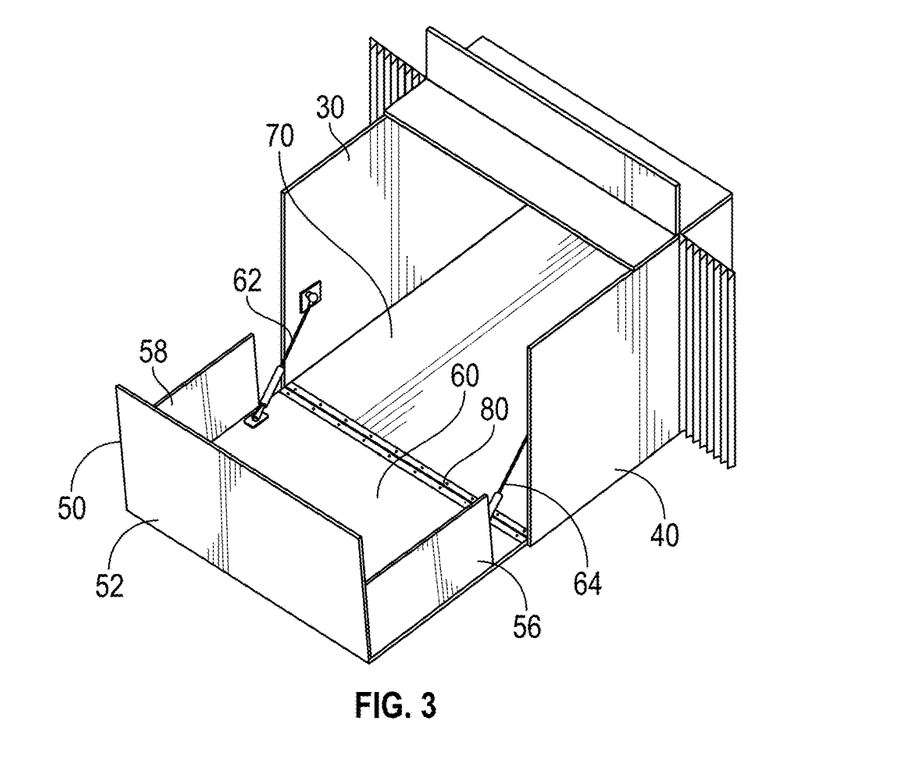
FIG. 3 is a diagrammatic perspective view of the unit of FIGS. 1 and 2 showing the outer movable section in a fully opened position.

As best seen in FIGS. 2 and 3, movable section 50 includes movable section cover 52, outer wall 54 and side walls 56, 58—only seen when section 50 is open or partly open. As best seen in FIG. 3, in this embodiment, section 50 opens and closes via a hinge 80 that connects outer wall 54 to bottom platform 70 of main section 10. Now when fully open, outer wall 54 become a "floor" and the inner surface of outer wall 54 becomes an outdoor platform 60 onto which a delivered object may be deposited. Moreover, when fully open, because outdoor platform 60 is preferably in the same horizontal plane as the main section's bottom platform 70 (which in this embodiment, partially extends to the outdoors), these two platforms can serve as an extended platform 60+70 for delivered objects to be dropped or placed anywhere thereon. This larger surface area can reduce the positioning precision required by the aerial delivery vehicle before unloading the parcel that is intended to be delivered to unit 100.

It should be understood that while the unit is shown in the figure as a substantially rectangular or square box, the invention in not limited to these shapes. For example, the upper outdoor components of unit 100, namely outside cover portion 20 of main section 10 and movable section cover (or, movable section cover) 52 of movable section 50 need not be constructed as flat surface areas. Rather, in some embodiments, portion 20 and cover 52 may be rounded or bulging or convex such that when closed at juncture 51, the combined top takes on a dome-like shape. This may desirable to help prevent water accumulation on the top, particularly useful in locations where rain or other precipitation is a concern.

Once installed in a wall opening, unit 100 will preferably be connected to an electric power source to supply power to the components of unit 100 that need it to operate. As an "aftermarket" product, unit 100 may typically come with an electric cord (not shown) to be plugged into an electric outlet inside the room in which it is installed. As a product that is "built in" to a building opening (either in new construction or retrofit construction), power may be supplied to unit 100 from "within the wall." Alternatively, because a large part of unit 100 is suspended outdoors, unit 100 may be powered with solar power. Thus, solar panels can be installed on the outside outer surfaces of unit 100 in order to provide self-generating power capability. Alternatively, solar panels may be installed external to unit 100.

Once installed and in operation, unit 100 can open and close when section 50 is directed to do so. Opening the box may involve one or two steps: unlocking a normally locked section 50 and then opening the unit, or, in embodiments where separate locking is not needed, just opening unit 100. As seen in partially open state depicted in FIG. 2 and fully open state in FIG. 3, section 50 preferably controllably swings open at hinge 80. In this embodiment, a pair of linear actuators 62, 64 are provided, each having a first end connected to an opposite wall 30, 40 of main section 10, respectively, and a second end connected to an opposite wall 58, 56 of movable section 50, respectively. Thus, when instructed to open, linear actuators 62, 64 begin to extend, causing movable section 50 to being to pivot about hinge 80 opening unit 100 (FIG. 2) until it is in a fully open position (FIG. 3). Likewise, actuators 62, 64 are instructed to contract when unit 100 is to close. It should be understood that the linear actuation shown here is only one of many options for driving section 50 to open and closed positions. There may be only one actuator and it may be of any suitable type as will be understood. For example, the actuator(s) may be an electric motor (with or without a gearhead), hydraulic, air pressurized or any other known technology.

To activate the opening and closing of the unit, the unit 100 preferably includes a sensor (not shown), such as a wireless reader, that senses the presence of an approaching parcel intended to be dropped in or delivered to it. For example, the unit sensor may be a near field communications (NFC) reader that communicates instructions to the unit 100 actuator(s) 62, 64 to automatically open movable section 50 when a parcel intended to be delivered to the unit is close enough. Once fully opened as in FIG. 3, the parcel may be deposited onto the inner platform 60/70 of the inner volume of unit 100. In such embodiments, an NFC tag that is programmed to be read by the unit reader may either be attached to the delivery vehicle that carries the parcel or the unit or may be attached the parcel itself. The latter option may be preferable in a system where parcels may sometimes be delivered by hand (e.g. pizza or other food items) to a unit installed on a ground floor and accessible by a delivery person. Once the parcel is safely in place on the delivery platform, movable section 50 is preferably instructed to close. Unit 100 can independently determine that the parcel is properly on the delivery platform in any number of ways. For example, unit 100 may have a visual, radar or other sensor to sense the delivered object on platform 50/60, or platform 50/60 may itself include a sensing means such as a scale. Other means for detecting are well understood by those skilled in the art and are within the scope of the present invention.

Figure 4:
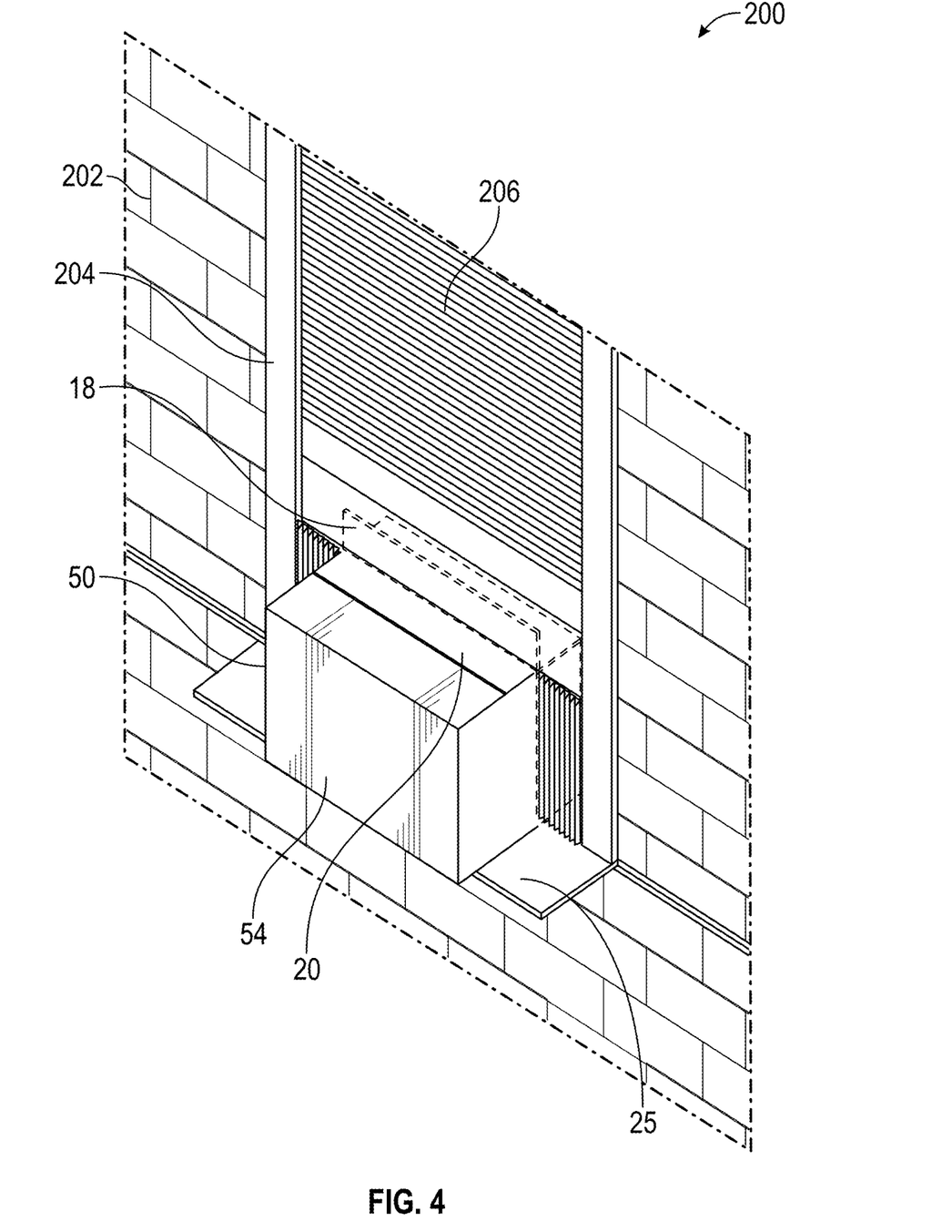
FIG. 4 is a diagrammatic perspective view of a unit as in FIG. 1 as installed in an opening of a building.

Turning now to FIG. 4, shown is a partial outdoor view of an exemplary building 200 with an aftermarket unit 100 as shown in FIGS. 1-3 installed therein according to one embodiment. Outer building wall 202 has a window opening 204 and slidable window 206. Unit 100 is partly resting on windowsill 25. Window 206 is pressed down onto outside cover portion 20 of main section 10. Flange 18 abuts the lower end of the inner side of slidable window 206 to help secure unit 100 in place. Side wings 14a, 14b are extended outwardly from unit 10 until they meet (and in some cases, secure to) the sides of the window opening.

After unit 100 is installed and connected to power, it is ready to receive parcels intended for it, however delivered. In the exemplary embodiment shown in FIG. 5, unit 100 may be installed in a window of, say, a high floor of a high-rise building. Drone 302 carrying parcel 350 approaches unit 100, and when it is close enough, unit 100 senses its presence (as discussed above) and activates to unlock movable section 50 (in embodiments where a separate locking mechanism is employed) and to actuate actuators 62, 64 to open movable section 50. Once fully opened, creating extended delivery platform 60+70, drone 302 can make it final approach directly over unit 100 and release parcel 350 by opening bottom 304 and depositing it onto the extended platform ("the drop").

Figure 5:
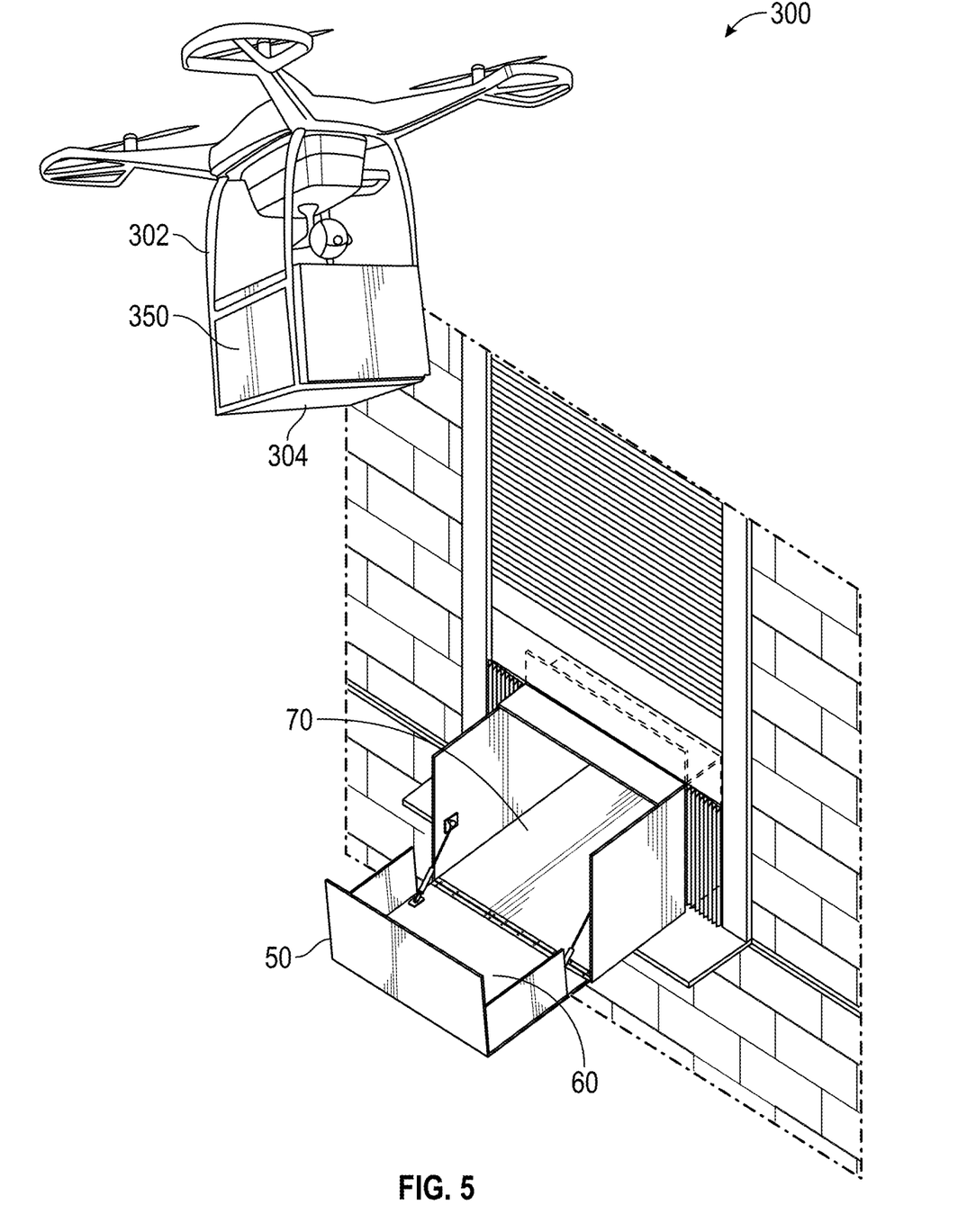
FIG. 5 is a diagrammatic perspective view of the unit shown in FIG. 4, with its outer movable section in an open position and a drone moving in position to deposit a package onto a platform created and exposed by the open unit.

As discussed above, a number of options are available for determining when to close movable section 50 after the parcel is deposited onto the delivery platform. As a yet another alternative for instructing unit 100 to close, drone 302's departure from the vicinity of unit 100, may signal unit 100 to close. However, the system is designed to close unit 100, to the extent now-deposited parcel 350 is sitting on or partially on outer platform 60, the preferably gentle rotatably closing action of movable section 50 will slide parcel 350 completely onto main platform 70 of non-movable section 10.

Once movable section 50 is totally closed, parcel 350 may be considered successfully "delivered." Now, a person may approach unit 100 from the inside the room in which it is installed and open door 12 to retrieve delivered parcel 350. It should be understood that door 12 may include a lock that locks the door in its normal state and may be unlocked automatically when unit 100 senses section 50 is totally closed, or only by an authorized person with a key (physical or virtual, say on an app). Moreover, any combination of these lock-unlock methods may be used, such that door 12 may be unlocked only for a set amount of time (say 5 or 10 minutes) from a parcel deliver. After that, a key may be needed to open door 12.

Also, it should be understood that the person for whom the parcel is intended need not be present when the delivery occurs. It is well understood that an app that can connected to the system of the present invention may be provided for download for user to installed on their mobile devices or other computing devices. This app can be program to notify the person that a parcel awaits her at the location of unit 100. That same app may also be programmed to unlock door 12 when it is active when it approaches unit 100.

It should also be understood that unit 100 is a standalone device that can be pre-assembled as unit and sold as such. Or it can be provided in components for assembly by a user/installer before installing in a building opening. In the former embodiments, it is contemplated that the device may be preassembled and sold in a box, much like a consumer may purchase wall air conditioning unit.

Not shown, but understood by persons skilled in the art, the device of the present invention preferably comes with all the electronics and sensors needed to both "operate" the box open and close, and to "know" when a delivery is near. Thus, for the latter function, it may also come with one or more sensors preinstalled that when in operation sense when a parcel that is being air delivered to it is near it, as seen in FIG. 5, and communicates to an actuator system to open the movable portion to the open position.

Embodiments of the present invention are particularly useful for the easy installation into existing homes and office buildings, using the same concept and similar structures used in installing wall-unit air conditioners in a standard window frame.

While embodiments of the invention have been illustrated and described, it is not intended that these embodiments illustrate and describe all possible forms of the invention. Various changes, modifications, and alterations in the teachings of the present invention may be contemplated by those skilled in the art without departing from the intended spirit and scope thereof. It is intended that the present invention encompass such changes and modifications.

The invention claimed is:

1. A unit for installing in an opening in a wall of a building, the wall having a first surface facing outdoors and a second surface facing an inside of the building, the unit for receiving an object intended to be delivered to it, the unit comprising:
   a. a non-movable section when the unit is installed in the opening; and
   b. a movable section connected to the non-movable section, the movable section adapted to move to an open position so that the object may be deposited inside the unit, and to move to a closed position after the object is deposited therein;
   wherein, when the movable section is in an open position, an inside surface of the movable section defines at least part of an object receiving platform onto which the object may be deposited; and
   wherein the opening in the wall of the building is a window opening, and the unit further includes a first extendable side wing having one end connected to a first side of the non-movable section and an opposite end for fastening to a first side of the window opening.

2. The unit of claim 1 further including a second extendable side wing having one end connected to a second side of the non-movable section opposing the first side of the non-movable section, and an opposite end for fastening to a second side of the window opening.

3. The unit of claim 1, wherein non-movable section includes an inside floor that at least partially extends outside of the building when the unit is installed in the opening, the inside floor and inside surface of the movable section together defining the object receiving platform when the movable section is in the open position.

4. The unit of claim 3, wherein the object receiving platform is adapted to receive the object deposited thereon by an unmanned aerial delivery vehicle.

5. The unit of claim 1, further including a sensor for sensing the proximity of the object intended to be delivered to the unit and communicates instructions to the unit to automatically open the movable section when the object tis is proximate the unit.

6. The unit of claim 5, wherein the sensor is configured to sense the proximity of a tag connected to the object.

7. The unit of claim 5, wherein the sensor is configured to sense the proximity of a tag connected to an unmanned aerial delivery vehicle that carries the object.

8. The unit of claim 1 further including a locking mechanism, such that when the movable section is in the closed position, the movable section and non-movable section are locked closed.

9. The unit of claim 8, further including a sensor in communication with the unit, such that when sensing that the object to be delivered to it is proximate the unit, the unit automatically unlocks the movable section and then the movable section moves to the open position.

10. A parcel-receiving unit for installing in an opening of a building and for receiving a package to be delivered therein, the unit comprising:
   c. an outdoor section that, when the unit is installed in the opening, extends outside of the building, the outdoor section including an outer movable wall having upper and lower ends and an inner wall surface; and a lid having a non-movable section and a movable section connected to the upper end of the outer movable wall; and
   d. a substantially horizontal, non-movable platform that, when the unit is installed in the opening, extends at least partly outside of the building, the platform having an outer end hingeably connected to the lower end of the outer movable wall, such that when the outer movable wall is in a fully open position, the inner wall surface of the outer wall and the non-movable platform define an enlarged platform for receiving the package.

11. The parcel-receiving unit of claim 10, further including an indoor section that, when the unit is installed in the building opening, is openable to the inside the building.

12. The parcel-receiving unit of claim 11, wherein the indoor section includes a door panel facing the inside of the building providing user access to the inside of the unit for retrieving the package deposited in the unit.

13. The parcel-receiving unit of claim 12, where the door panel is lockable.

14. The parcel-receiving unit of claim 10, further including an actuator for controllably swinging the outside section to open and closed positions.

15. The parcel-receiving unit of claim 14, further wherein the actuator automatically moves the outside portion to the open position when receiving instructions that the package is ready to be delivered to the unit, and automatically moves the outside portion to the closed position after the package is deposited on the enlarged platform.

16. The parcel-receiving unit of claim 15, further including a communications module in communication with a delivery vehicle or delivery person that is delivering the package and that instructs the actuator to open the outside portion when the package is within a predetermined distance from the unit.

17. The parcel-receiving unit of claim 16, further including a sensor connected to the actuator that senses when the package is ready to be delivered to the unit is near and instructs the actuator to open the outside portion for receiving the package.

18. The parcel-receiving unit of claim 10, further including left and right sides each having an adjustable wing extending outwardly therefrom, and wherein the unit is adapted to be adjustably installed in the building opening using the adjustable wings.

* * * * *